(12) United States Patent
Butterweck et al.

(10) Patent No.: US 7,503,041 B2
(45) Date of Patent: Mar. 10, 2009

(54) APPARATUS, SYSTEM, AND METHOD FOR DELIVERY OF SOFTWARE

(75) Inventors: John Butterweck, Livermore, CA (US); James Owen Campbell, Los Gatos, CA (US); Beng K. Chiu, San Jose, CA (US); James Edward Zimmer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/883,127

(22) Filed: Jul. 1, 2004

(65) Prior Publication Data

US 2006/0005182 A1    Jan. 5, 2006

(51) Int. Cl.
*G06F 9/44* (2006.01)
*G06F 9/445* (2006.01)

(52) U.S. Cl. .................. 717/168; 717/174

(58) Field of Classification Search .......... 717/101, 717/121, 127, 168, 174, 177; 705/57; 714/146
See application file for complete search history.

(56) References Cited

U.S. PATENT DOCUMENTS

| | | | |
|---|---|---|---|
| 5,805,891 A | 9/1998 | Bizuneh et al. ............. 395/704 |
| 5,960,196 A * | 9/1999 | Carrier et al. ............... 717/122 |
| 6,286,137 B1 | 9/2001 | Bleizeffer et al. ............. 717/11 |
| 6,385,766 B1 | 5/2002 | Doran, Jr. et al. ............. 717/11 |
| 6,425,078 B1 * | 7/2002 | Smith et al. .................... 713/1 |
| 6,434,568 B1 * | 8/2002 | Bowman-Amuah ......... 707/103 |
| 6,601,192 B1 * | 7/2003 | Bowman-Amuah .......... 714/38 |
| 6,606,744 B1 * | 8/2003 | Mikurak ..................... 717/174 |
| 6,715,134 B2 * | 3/2004 | Chang et al. .................... 716/4 |
| 6,715,144 B2 | 3/2004 | Daynes et al. ............... 717/174 |
| 6,725,399 B1 * | 4/2004 | Bowman ..................... 714/38 |
| 6,983,449 B2 * | 1/2006 | Newman ..................... 717/121 |
| 6,993,761 B1 * | 1/2006 | Czajkowski et al. ......... 718/100 |
| 7,194,730 B2 * | 3/2007 | Pramberger ................. 717/120 |
| 7,216,343 B2 * | 5/2007 | Das et al. .................... 717/168 |
| 7,315,826 B1 * | 1/2008 | Guheen et al. ................. 705/7 |
| 2002/0040469 A1 * | 4/2002 | Pramberger ................. 717/121 |
| 2002/0128975 A1 | 9/2002 | Klemba et al. ................ 705/57 |
| 2003/0018932 A1 | 1/2003 | Blum et al. .................. 714/46 |
| 2003/0046681 A1 | 3/2003 | Barturen et al. ............. 717/177 |

(Continued)

OTHER PUBLICATIONS

"Windows Driver Development Kit: Overview"; Jun. 11, 2004; Microsoft, Inc.*

(Continued)

*Primary Examiner*—Wei Y. Zhen
*Assistant Examiner*—Chih-Ching Chow
(74) *Attorney, Agent, or Firm*—Kunzler & McKenzie

(57) ABSTRACT

An apparatus, system, and method are disclosed for delivery of software. A snapshot module is included to create a snapshot of development software libraries still in a development phase, the development software libraries comprising substantially an entire replacement set of software code. A testing module is included to apply a set of tests to the snapshot to ensure that the snapshot is substantially free from defects and a delivery module delivers the snapshot to a user. The snapshot may be configured for a mainframe computer operating system such that a previous version of the software code is replaced in a single operation. The mainframe computer operating system may be the z/OS operating system.

10 Claims, 6 Drawing Sheets

U.S. PATENT DOCUMENTS

| | | | |
|---|---|---|---|
| 2003/0229884 A1 | 12/2003 | Carr et al. | 717/101 |
| 2004/0031030 A1* | 2/2004 | Kidder et al. | 717/172 |
| 2004/0044996 A1 | 3/2004 | Atallah | 717/169 |
| 2004/0054988 A1 | 3/2004 | Atallah et al. | 717/122 |
| 2004/0068722 A1 | 4/2004 | Amodio et al. | 717/169 |

OTHER PUBLICATIONS

IBM, IBM SMP/E for z/OS and OS/390 Users Guide, Aug. 2003, 5th Ed., p. 1.*

IBM SMP/E for z/OS and OS/390, User's Guide, SA22-7773-04; Chapter 4, "Installing a New Function" pp. 83-90; 1986.

"Version Management with CVS," Per Cederqvist et al. for cvs 1.11.17.

Mainframe.com, SMP/E Evironment, http://www.mainframes.com/smpe.htm.

1.4 Hardware requirments; ABCs of z/OS System Programming -vol. 1; p. 6-44.

RCS, http://www.qnu.org/software/rcs/rcs.html.

* cited by examiner

APPARATUS, SYSTEM, AND METHOD FOR DELIVERY OF SOFTWARE

BACKGROUND OF THE INVENTION

1. Field of the Invention

This invention relates to software delivery and more particularly relates to software delivery of a developmental software library in a developmental phase for a mainframe computer.

2. Description of the Related Art

In developing applications for mainframe operating systems, there is a need to release software to Independent Software Vendors ("ISV") during a developmental phase so they can work in parallel with the application design team to develop software tools for the application. Updates of the release software should be frequent to capture changes and defect corrections made by the software design team and to respond to defects hindering development of ISV tools. Typically, as shown in the flowchart 100 of FIG. 1, when an application is developed and tested such that the application can be sent to the ISVs, the application code is used to create 102 a software driver that can be sent to the ISVs. A software driver typically consists of development software libraries. Typical elements of the software libraries are source code, object code, modules, panels, macros, and sample code.

Next, the software driver is tested 104. Typically, the testing includes regression testing using test cases. For example, testing for International Business Machine's ("IBM") Information Management System ("IMS"), a database and transaction management application, may include approximately one-hundred and fifty test cases. In addition, testing may include verification of installation and sample systems. An example of such a testing method is the IMS Installation Verification Program ("IVP"), which includes a set of panels to guide a user through customization and testing of sample IMS systems.

If a defect is detected 106 during testing, the defect is reported 108, corrected 110, a new software driver is created 102, and the driver is tested 104 again. The testing 104 after a defect is corrected 110 may be extensive or minimal depending upon the defect.

Once the above mentioned testing 104 is completed, the software driver is converted 112 to a proprietary format for a software maintenance application such as System Modification Program Extended ("SMP/E") that is typically integrated with the z/OS or OS 390 mainframe operating systems. In order to ensure that the conversion 112 did not introduce errors, the converted software is tested 114 again. If errors are detected 116, they are again reported 108, corrected 110, and a new software driver is created 102. The driver may have to be retested 104 and reconverted 112 and the conversion retested 114 many times. Once this conversion testing 114 is completed, the SMP/E compatible software driver is typically loaded 118 onto tapes and delivered 120 to the ISVs. SMP/E support libraries are also included with the SMP/E compatible software driver.

Once the ISVs receive the tapes, they in turn install 122 the SMP/E compatible driver on their mainframe computers, and if the software driver is not a software driver update, the ISV may then use 124 the software driver. Traditionally, the same method 100 is repeated in order to create 102 software driver updates. Typically, a software driver update includes just the changed files or libraries of a software driver. If a software driver update is created 102 and converted 112 to the SMP/E format, typically only incremental updates are included and bundled together in the software driver update, each incremental update relates to a particular change in the software application. Incremental updates may depend on each other depending on the kinds of changes that have been made.

The process of converting 112 a software driver update to the SMP/E format and testing 114 may be very cumbersome for the software driver design team, especially if there are a large number of incremental updates in a software driver. For example, rather than meeting a goal of monthly updates, the IMS design team may only be able to deliver one software driver update to the ISVs in a six month development period. This creates a problem since the ISVs are not able to receive timely updates and errors are not corrected quickly. ISVs may have to work with a software driver having uncorrected defects for an extended period of time which may delay completion of software driver tools developed by the ISVs.

The process of installing 122 an SMP/E compatible driver update is cumbersome for the ISVs because the SMP/E tool installs 122 the driver update incrementally. When an ISV applies the driver update, there may be a large number of incremental updates included and some of the incremental updates may require manual involvement. The manual involvement during installation 122 of a driver update may be cumbersome and repetitive when a large amount of incremental updates are included in the driver update. Once the software driver update is installed 122 and manual involvement is finished, the software driver update may be used 124.

From the foregoing discussion, it should be apparent that a need exists for an apparatus, system, and method for efficient software delivery. Beneficially, such an apparatus, system, and method would reduce the time and effort required from the software driver design team and from the software driver users, such as ISVs, to install an update of a software driver that replaces essentially the whole software driver code, would be responsive to the needs of ISVs for quick error correction, and would allow software driver updates with a large number of incremental updates to be packaged in a single code update.

SUMMARY OF THE INVENTION

The present invention has been developed in response to the present state of the art, and in particular, in response to the problems and needs in the art that have not yet been fully solved by currently available software delivery methods. Accordingly, the present invention has been developed to provide an apparatus, system, and method for delivery of software that overcomes many or all of the above-discussed shortcomings in the art.

The apparatus for delivery of software is provided with a logic unit containing a plurality of modules configured to functionally execute the necessary steps of creating a snapshot of developmental software libraries, testing the snapshot, and delivering the snapshot to a user via an electronic communications channel. These modules in the described embodiments include a snapshot module that creates a snapshot of development software libraries still in a development phase, the development software libraries comprising substantially an entire replacement set of software code, a testing module that applies a set of tests to the snapshot to ensure that the snapshot is substantially free from defects, and a delivery module configured to deliver the snapshot to a user.

In one embodiment, the snapshot is configured to replace code for a mainframe computer operating system such that a previous version of the software code is replaced in a single operation. The snapshot may comprise an incremental update or a plurality of incremental updates in a single package. In another embodiment, the mainframe computer operating system is the z/OS operating system.

The apparatus, in one embodiment, is configured to exclude a conversion test for a software maintenance application. In a further embodiment, the software maintenance application may be System Modification Program Extended ("SMP/E"). In one embodiment, the snapshot is configured to be substantially free from software maintenance application dependencies.

The apparatus may include a tracking module that tracks a code defect in the snapshot and to report the defect. In another embodiment, the code defect is discovered and reported by a group consisting of a user, a code developer, and a software application. In yet another embodiment, a documentation module is included to document snapshot attributes.

In one embodiment, the delivery module delivers the snapshot using an electronic communication channel. In an alternate embodiment, the delivery module further includes a posting module that posts the snapshot to an electronic site and a download module that downloads the snapshot from the electronic site.

A system of the present invention is also presented for delivery of software. The system may be embodied by a processing unit. In particular, the system, in one embodiment, includes a snapshot module in the processing unit to create a snapshot of development software libraries still in a development phase, the development software libraries including substantially an entire replacement set of software code, a testing module to apply a set of tests to the snapshot to ensure that the snapshot is substantially free from defects, a delivery module to deliver the snapshot to a user, a tracking module to track a code defect in the snapshot and to report the defects, and a documentation module to document snapshot attributes.

The system may further include a mainframe computer in electronic communication with the processing unit via a communication channel. The snapshot, in another embodiment, is configured to replace code for a mainframe computer operating system such that a previous version of the software code is replaced in a single operation. In a further embodiment, the mainframe computer operating system is the z/OS operating system.

The set of tests, in one embodiment, exclude a conversion test for a software maintenance application. In an alternate embodiment, the software maintenance application may be System Modification Program Extended ("SMP/E"). In a further embodiment, the snapshot may be substantially free from software maintenance application dependencies. In another embodiment, the code defect is discovered and reported by a group consisting of a user, a code developer, and a software application. In an alternate configuration, the delivery module includes a posting module that posts the snapshot to an electronic site and a download module that downloads the snapshot from the electronic site.

A method of the present invention is also presented for delivery of software. The method in the disclosed embodiments substantially includes the steps necessary to carry out the functions presented above with respect to the operation of the described apparatus and system. In one embodiment, the method includes creating a snapshot of development software libraries still in a development phase, the development software libraries comprising substantially an entire replacement set of software code, applying a set of tests to the snapshot to ensure that the snapshot is substantially free from defects, and delivering the snapshot to a user.

The snapshot, in one embodiment, is configured to replace code for a mainframe computer operating system such that a previous version of the software code is replaced in a single operation. In another embodiment, the mainframe computer operating system is the z/OS operating system.

In a further embodiment, the set of tests exclude a conversion test for a software maintenance application. In another embodiment, the software maintenance application may be System Modification Program Extended ("SMP/E"). In one embodiment, the snapshot is configured to be substantially free from software maintenance application dependencies.

The method, in one embodiment, may include tracking a code defect in the snapshot and to report the defect. In another embodiment, the code defect is discovered and reported by a group consisting of a user, a code developer, and a software application. Another embodiment includes documenting snapshot attributes. The method may also include delivering the snapshot using an electronic communication channel. Delivering the snapshot using an electronic communication channel may include posting the snapshot to an electronic site and downloading the snapshot from the electronic site.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
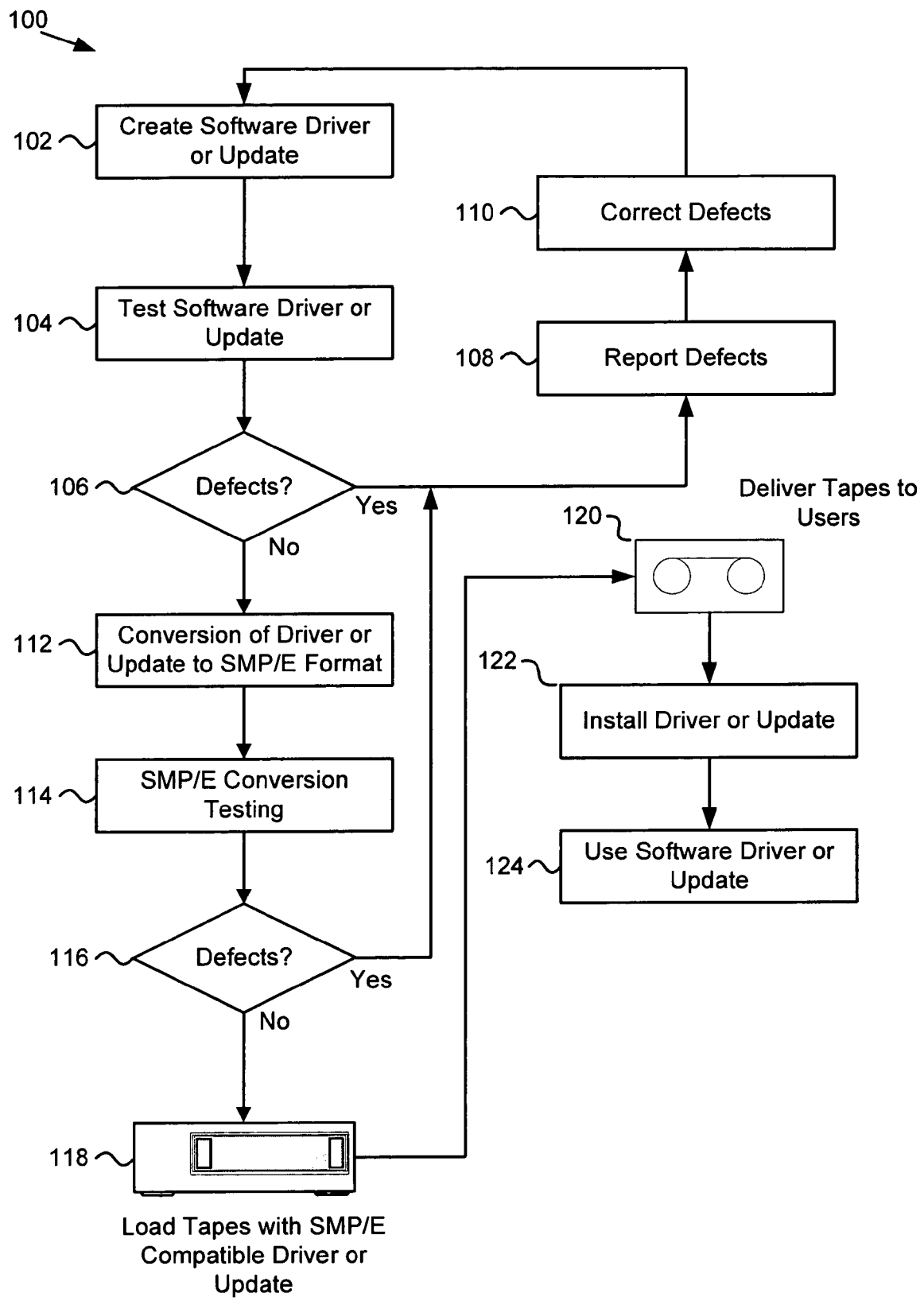
FIG. 1 is a schematic block diagram illustrating one embodiment of a conventional process flow for software delivery.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
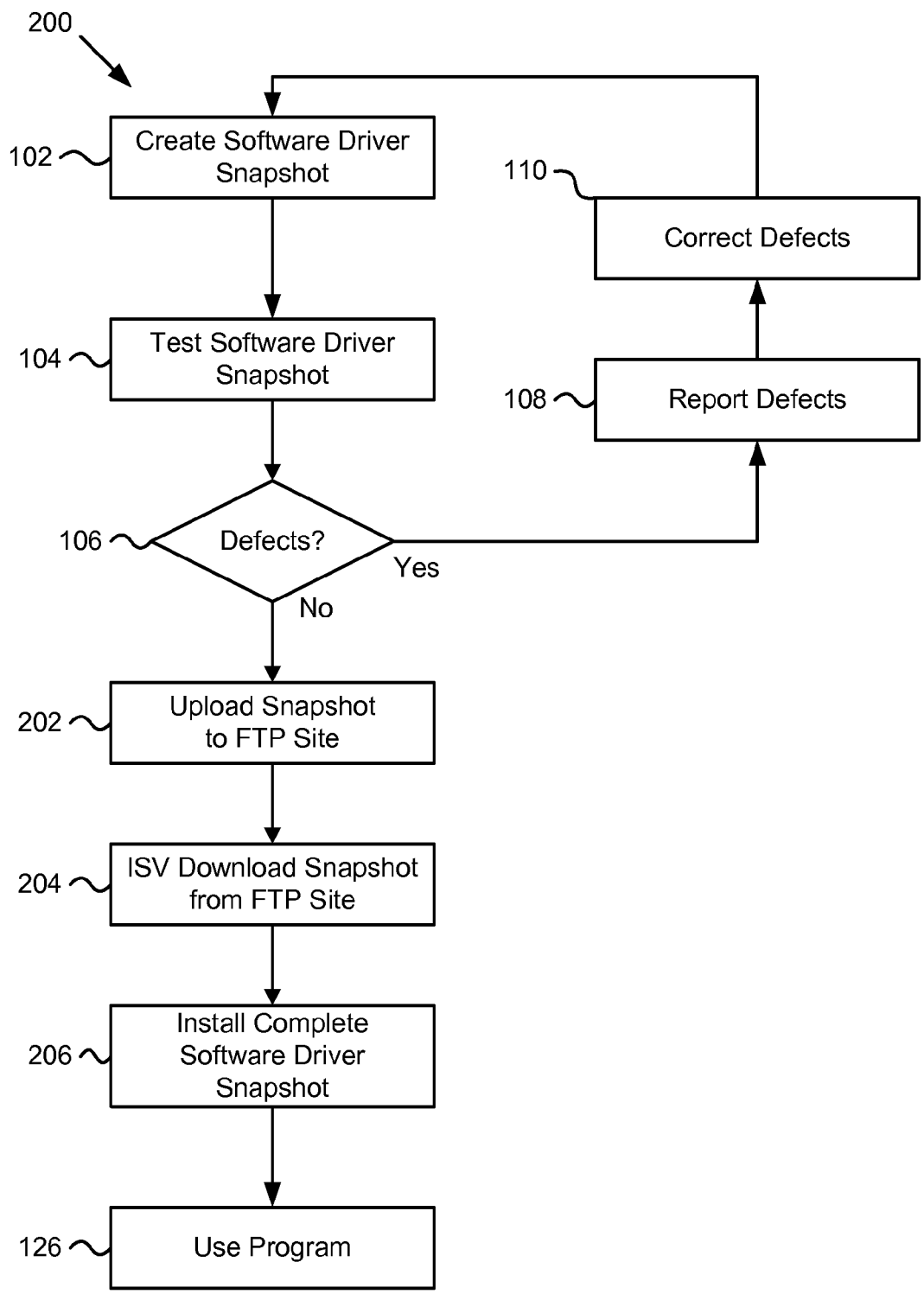
FIG. 2 is a schematic block diagram illustrating one embodiment of method for delivery of software in accordance with the present invention.

FIG. 2 depicts a schematic block diagram of a method 200 for delivery of software in accordance with the present invention. In this method 200, once the developmental software libraries are developed and tested to a point where they are ready to be sent to the ISVs, the developmental software libraries are used to create 102 a software driver that can be sent to the ISVs. The software driver is referred to herein as "a software driver snapshot" or simply "a snapshot" because a substantially complete copy of the developmental libraries is created at a particular point in time. The software driver snapshot is then tested 104 as was discussed in relation to FIG. 1. Again, if a defect is detected 106, the defect is reported 108, corrected 110, a new software driver snapshot is created 102, and the software driver snapshot is tested 104 again.

In the present invention, instead of creating SMP/E compatible libraries with incremental updates, the entire software driver snapshot is sent to the ISVs. For an ISV, instead of applying a snapshot driver update with incremental updates, as is the case with SMP/E, which may require a great deal of manual user involvement, for the present invention, the ISV need only install the complete software driver snapshot. In addition, rather than delivering 120 tapes with the software driver snapshot, the software driver snapshot is uploaded 202 to a File Transfer Protocol ("FTP") site. The ISVs then download 204 the software driver snapshot. This process takes much less time and human resources than the conventional method 100, because there is no need to convert the software driver to the SMP/E format, test the converted software driver, or for a large amount of manual user involvement from an ISV.

Installation 206 is achieved simply by installing the new, complete software driver. The software driver is then ready for use 126. This installation process 206 is much less cumbersome for the ISV than installing software updates using SMP/E compatible software drivers and the SMP/E application.

With the new method 200, the ISV uses well known software tools to unpack and install 206 the new program essentially in a single step. Substantially all old code libraries on a target system are replaced. For example, the installation of the IMS driver uses readily available software tools called TRSMAIN and ADRDSSU to explode and install the software driver. A technician or end-user may then customize the software driver to their needs. The installation is simple, repeatable, and saves the design team and ISVs valuable development time. In contrast, using SMP/E requires more time and human resources, especially for software driver updates with many incremental updates.

Figure 3:
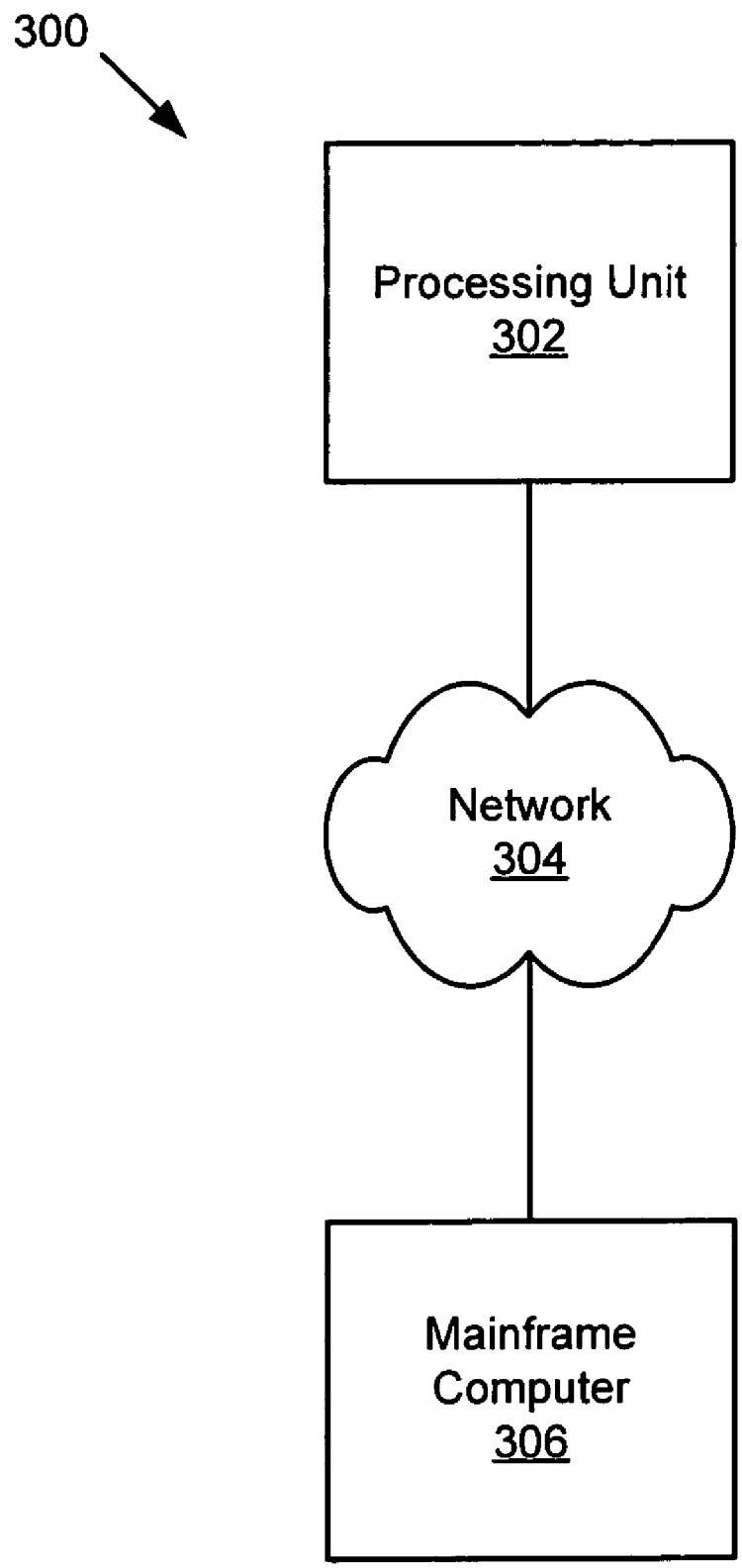
FIG. 3 is a schematic block diagram of a system for delivery of software in accordance with the present invention.

FIG. 3 is a schematic block diagram of a system 300 for delivery of software in accordance with the present invention. In the system 300, a processing unit 302 is connected to a network 304 which then connects to a mainframe computer 304. The processing unit 302 is typically located at a software manufacturer's development facility and may be embodied by a mainframe computer, a desk-top computer, or a workstation.

The network 304 may be embodied by a wide area network, a local area network, a fiber optic connection, the Internet, or any other electronic media allowing direct transfer of a software driver. Alternatively, the processing unit 302 is directly connected to the mainframe computer 304.

The mainframe computer 306 is typically located at the end-user facility. The end-user may comprise an ISV, a third-party vendor, or any other user of the software driver. The mainframe computer 306 alternatively may comprise any suitably configured computer at the end-user facility that can download or otherwise receive the software driver. Once loaded, the software driver is installed on the mainframe computer 306 and an ISV can then test its tools with the new software driver. One skilled in the art will recognize alternate configurations of computers, networks, mainframes, and other hardware for delivery of software from a software driver developer to a user.

Figure 4:
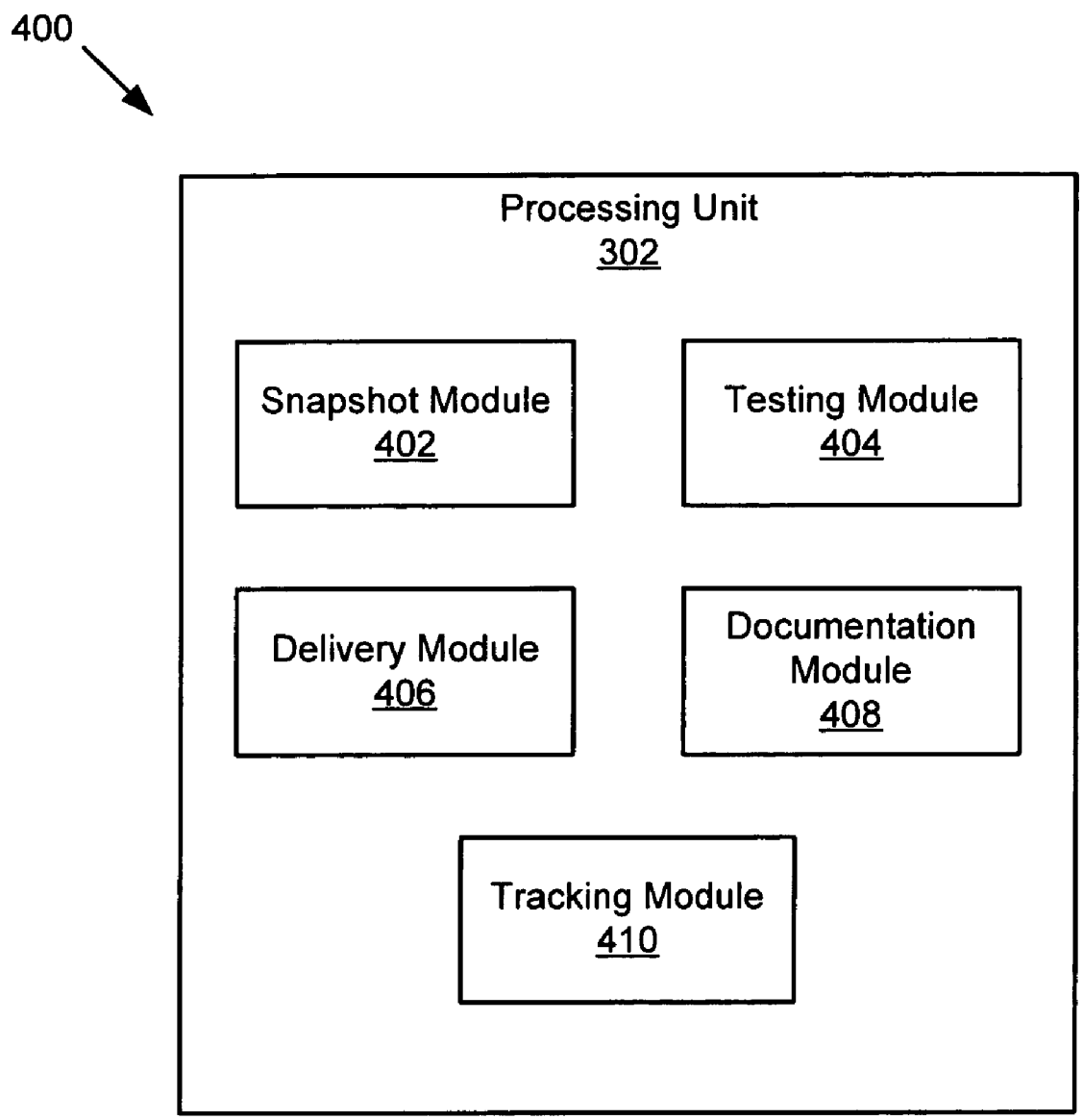
FIG. 4 is a schematic block diagram of an apparatus for delivery of software in accordance with the present invention.

FIG. 4 is a schematic drawing of an apparatus 400 for delivery of software in accordance with the present invention. The apparatus 400 may include in the processing unit 302 a snapshot module 402 configured to create a snapshot at a particular point in time of a development software library. A snapshot preferably comprises a complete set of binary and source code configured to replace a corresponding set of software code at a user site.

In one embodiment, the snapshot may require minimal customization to operate at the customer site. The snapshot may be created by copying the complete development software library source code, object code, modules, libraries, macros, panels, samples, and other parts of the development software libraries such that the snapshot is a complete software driver. The snapshot does not include SMP/E libraries and is not converted to the SMP/E format. The time when a snapshot is created may be determined by a software driver design team based on achieving a state of usability deemed acceptable to the design team for delivery of the software driver to the users. Typically, the development software library is tested extensively prior to creation of a snapshot 402.

The processing unit 302 may also include a testing module 404 configured to test the snapshot of the software driver. A delivery module 406 is configured to deliver the snapshot to a user. In one embodiment, the processing unit 302 includes a documentation module 408 configured to document software driver attributes. In another embodiment, the processing unit 302 includes a tracking module 410 configured to track and report software driver defects. Each module will be further defined in relation to FIGS. 5 and 6.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
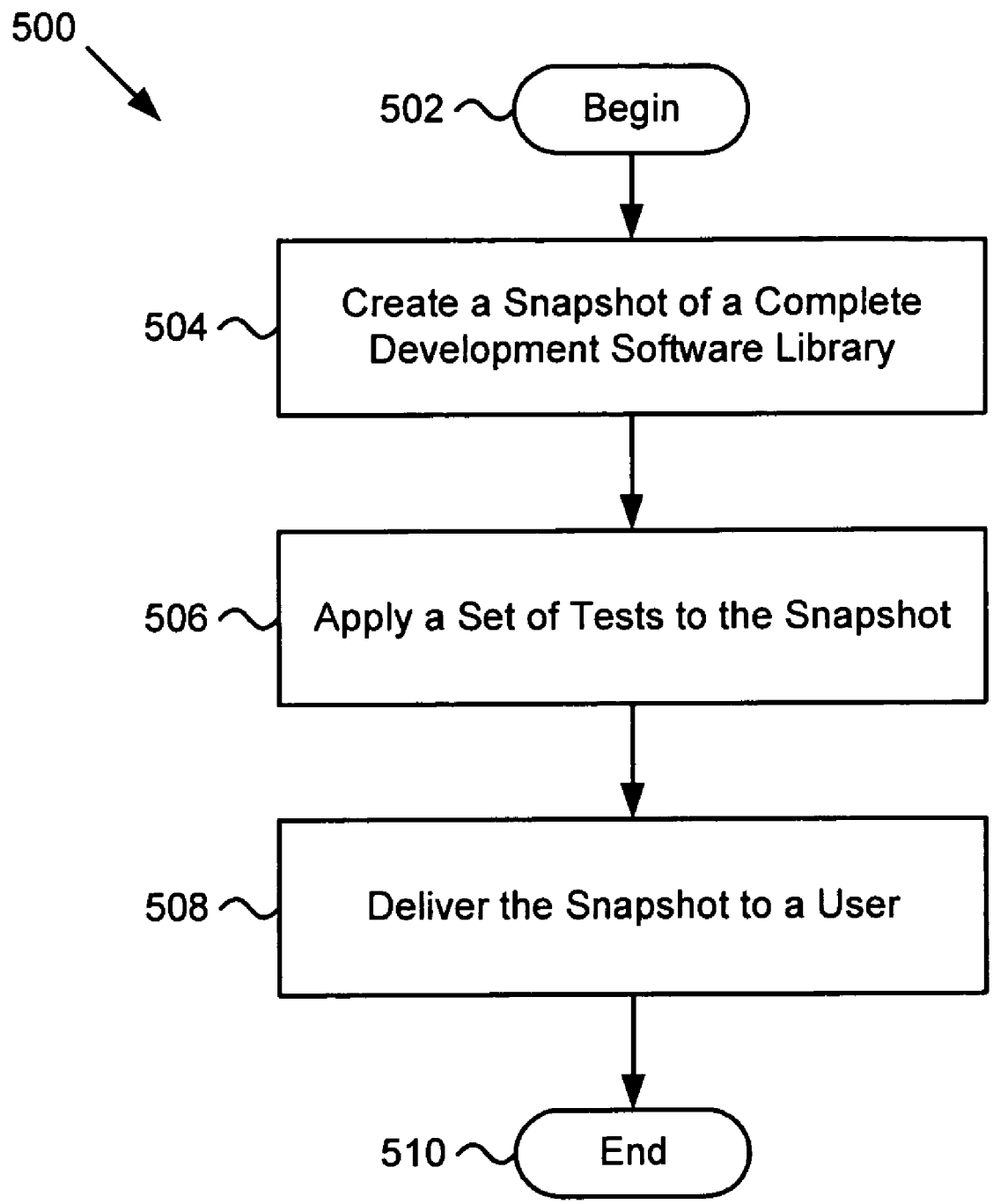
FIG. 5 is a schematic flow chart diagram illustrating one embodiment of a method for delivery of software in accordance with the present invention.

FIG. 5 is a schematic flow chart diagram illustrating one embodiment of method 500 for delivery of software in accordance with the present invention. The method 500 begins 502 when the snapshot module 402 creates 504 a snapshot of a complete development software library. The testing module 404 then tests 506 the snapshot. Testing may include regression testing using test cases, IVP testing, or any other testing useful in determining proper functionality of the snapshot. One skilled in the art will recognize other testing useful to the software design team in determining the stage of completeness and functionality of the snapshot.

The delivery module 406 then delivers 508 the snapshot to a user and the method 500 ends 510. As mentioned in relation to FIG. 2, in a preferred embodiment, the delivery module 406 uploads the snapshot to an FTP site and then the user downloads the snapshot from the FTP site. The user may use any FTP client capable of retrieving files from a secure FTP site. The snapshot may also be delivered 508 by sending the snapshot in an email, saving the snapshot on a computer accessible to the user, storing the snapshot on computer readable media, or through any other electronic channel.

Figure 6:
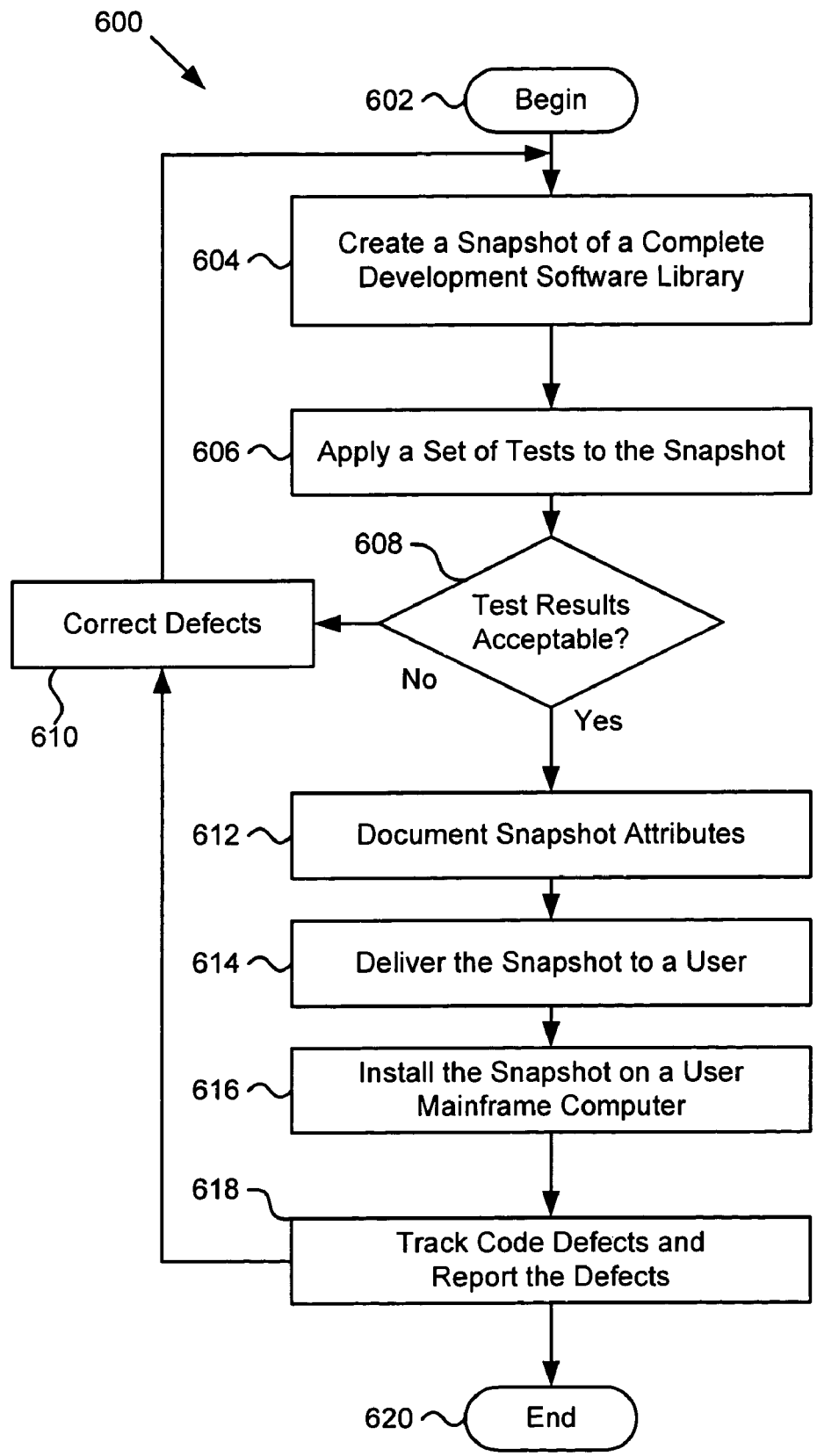
FIG. 6 is a schematic flow chart diagram illustrating a more detailed embodiment of a method for delivery of software in accordance with the present invention.

FIG. 6 is a schematic flow chart diagram illustrating a more detailed embodiment of a method 600 for delivery of software in accordance with the present invention. The method begins 602 when the snapshot module 402 creates 604 a snapshot of the complete software delivery. The testing module 404 applies 606 a set of tests to the snapshot as described above. Once the testing is complete, the test results are evaluated 608 to determine if the results are acceptable for sending the snapshot to users. If not, certain defects are corrected 610, the snapshot module 402 creates 604 a new snapshot, and the testing module 404 applies 606 a set of tests again. For example, one development team may use a go-no-go approach to evaluate the test results.

In the go-no-go approach, a team leader may poll the team members once 95% of the tests are passed successfully. Each member must agree that the snapshot is acceptable for shipment before the snapshot is transmitted to a user. If the snapshot evaluation determines 608 that the snapshot is suitable for delivery, the documentation module 408 then documents 612 attributes of the snapshot. Snapshot attributes may include documentation of known defects, defect corrections, added features and functions, defect tracking numbers, installation instructions, version number, application notes, workarounds, and/or other information deemed useful to the user.

The delivery module 406 then delivers 614 the snapshot to a user as discussed in the method 500 of FIG. 5 and the method 200 of FIG. 2. The snapshot is then installed 616 on a mainframe computer.

In one embodiment, a tracking module 410 may track 618 and report defects in the snapshot and the method 600 ends 620. Reported defects are corrected 610 as discussed above. Tracking and reporting 618 of defect may take many forms. In one embodiment, the tracking module 410 is used and accessible to the software developers and engineers. In another embodiment, the tracking module 410 is used and accessible to the snapshot users. In yet another embodiment, both the software developers and snapshot users access and use the tracking module 410. The tracking module 410 may be embodied by a software application, hardware, or a combination of the two. The tracking module 410 may be available to a user in a client-server environment or through a website. One skilled in the art will recognize other embodiments to track snapshot defects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for delivering software, said method comprising:

encoding a first set of computer instructions onto a memory, said first instructions configured to create a snapshot of IBM Information Management System (IMS) development software libraries that are still in a development phase, the IBM IMS development software libraries comprising substantially an entire replacement set of software code, the IBM IMS snapshot comprising a complete software driver that is a substantially complete copy of the IBM IMS development software libraries at a particular point in time in the developmental phase that is prior to completion of the IBM IMS software library;

encoding a second set of computer instructions onto a memory, said second instructions configured to apply a set of tests to the snapshot to ensure that the snapshot is substantially free from defects, wherein the snapshot is rejected in response to the testing module determining that the snapshot is not substantially free from defects; and encoding a third set of computer instructions onto a memory, said third instructions configured to deliver the entire snapshot to a user in response to the testing module determining that the snapshot is substantially free from defects, the user comprising a third-party developer using the IBM IMS development software libraries to develop tools separate from the IBM IMS software library during the developmental phase and prior to completion of the IBM IMS software library, and wherein the snapshot is installed without invoking System Modification Program Extended (SMP/E); and wherein the instructions further comprise an operation to deliver the snapshot to the user according to the File Transfer Protocol (FTP) protocol using an electronic site and operation to download the snapshot from the electronic site using the FTP protocol.

2. The method of claim 1, wherein the snapshot is configured to replace code for a mainframe computer operating system such that a previous version of the software code is replaced in a single operation.

3. The method of claim 2, wherein the mainframe computer operating system comprises the z/OS operating system.

4. The method of claim 1, wherein the set of tests exclude a conversion test for a verifying a proper code conversion by SMP/E.

5. The method of claim 1, wherein the snapshot is configured to be substantially free from software maintenance application dependencies.

6. The method of claim 1, wherein the instructions further comprise an operation to track a code defect in the snapshot and to report the defect.

7. The method of claim 1, wherein the code defect is discovered and reported by a group consisting of a user, a code developer, and a software application.

8. The method of claim 1, wherein the instructions further comprise operations to document snapshot attributes.

9. The method of claim 1, wherein the instructions further comprise an operation to deliver the snapshot using an electronic communication channel.

10. The method of claim 1, wherein the operation to deliver the snapshot using an electronic communication channel further comprises an operation to post the snapshot to an electronic site and an operation to download the snapshot from the electronic site.

\* \* \* \* \*